United States Patent
Yu

(10) Patent No.: US 8,659,561 B2
(45) Date of Patent: Feb. 25, 2014

(54) DISPLAY DEVICE INCLUDING OPTICAL SENSING FRAME AND METHOD OF SENSING TOUCH

(75) Inventor: Byung-Chun Yu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 476 days.

(21) Appl. No.: 12/969,086

(22) Filed: Dec. 15, 2010

(65) Prior Publication Data

US 2011/0148819 A1   Jun. 23, 2011

(30) Foreign Application Priority Data

Dec. 18, 2009  (KR) .................. 10-2009-0126534
Dec. 8, 2010   (KR) .................. 10-2010-0125157

(51) Int. Cl.
   *G09G 5/00*   (2006.01)
(52) U.S. Cl.
   USPC ......... 345/173; 345/175; 345/178; 178/18.09
(58) Field of Classification Search
   USPC ................... 345/173–178; 178/18.01–18.09, 178/19.01–19.06
   See application file for complete search history.

(56) References Cited

U.S. PATENT DOCUMENTS

| | | | |
|---|---|---|---|
| 2006/0202974 A1* | 9/2006 | Thielman | 345/175 |
| 2008/0138015 A1* | 6/2008 | Song et al. | 385/49 |
| 2009/0058833 A1* | 3/2009 | Newton | 345/175 |
| 2009/0059614 A1* | 3/2009 | Henson et al. | 362/553 |

FOREIGN PATENT DOCUMENTS

| | | |
|---|---|---|
| CN | 1433557 A | 7/2003 |
| WO | WO 2009/076503 A1 | 6/2009 |

OTHER PUBLICATIONS

Office Action issued in corresponding Chinese Patent Application No. 201010625009.3, mailed Dec. 31, 2012.
Search Report issued in corresponding Chinese Patent Application No. 201010625009.3, mailed Dec. 21, 2012.

* cited by examiner

*Primary Examiner* — Jennifer Nguyen
(74) *Attorney, Agent, or Firm* — Brinks Hofer & Gilson

(57) ABSTRACT

A method of sensing touch on a display device having an optical sensing frame includes emitting first light from a sensor module, receiving a first reflection at the sensor module, emitting second light from a waveguide, receiving a second reflection at the waveguide, and if a touch is made on an optical sensing frame, detecting that reflections of the first and the second light are interfered and determining a change in the quantity of the first and second reflection received to determine the touch.

17 Claims, 8 Drawing Sheets

DISPLAY DEVICE INCLUDING OPTICAL SENSING FRAME AND METHOD OF SENSING TOUCH

This application claims the benefit of the Korean Patent Application No. 10-2009-0126534, filed on Dec. 18, 2009 and Korean Patent Application No. 10-2010-0125157, filed on Dec. 8, 2010, which are hereby incorporated by reference as if fully set forth herein.

BACKGROUND

1. Field of the Invention

The present disclosure relates to a method of sensing touch, more particularly, to a display device including an optical sensing frame, which can detect multi-touches by locating an infrared camera sensor in a second corner of a liquid crystal panel, with a waveguide unit having at least two layers configured of light receiving and emitting layers, and a method of detecting touches.

2. Discussion of the Related Art

In general, a touch panel is one of elements which forms an interface between users and telecommunication devices using a variety of displays. A user may touch a screen of the touch panel by using a pen or his/her finger and he/she may interface with the telecommunication devices.

Such panel is an input device which can be used by people of all ages and sexes, because they only have to do touch a button of a display with their fingers to use the touch panel communicatively and intuitively. As a result, touch panels have been applied to various fields, for example, certificate-issuing devices used in banks or public offices, various medical apparatuses and guide devices used in sightseeing guides and traffic system guide and devices used in important organizations.

Such touch panel may be categorized into a resistive type touch panel, a micro capacitive touch glass, an ultrasonic wave glass and an infrared type touch panel, based on a touch recognition type.

First of all, the resistive type touch panel is configured of two transparent layers having conductivity. A bottom layer is formed of glass having conductive material coated thereon and a top layer is formed of film having conductive material coated thereon. The two layers are spaced apart a predetermined distance by a micro-printed spacer and are electrically insulated from each other. According to this resistive type touch panel, a predetermined voltage is applied to the two layers having the conductive materials respectively coated thereon. When a human finger or a touch pen touches the top layer in this state, resistance of the top layer (X axis) or the bottom layer (Y axis) may change according to the location of the touch. At this time, predetermined points of X and Y having changing resistive values are computed by a controller and the controller displays coordinates on a monitor or data is inputted.

The micro capacitive touch glass is configured of a transparent glass sensor having a thin conductor coated thereon. Because of that, an electrode pattern is precisely printed along an edge of a conductor layer and a transparent glass protection coating layer closely contacts with the conductor layer to protect and cover the sensor. According to this micro capacitive type touch panel, a voltage is applied to a screen and the electrode pattern forms a low voltage field on a touch sensor surface by using the conductor layer. When the human finger touches the screen, minute currents may be generated at touch points. The distance of the current flow from each corner is in proportion to the distance from the corner to the human finger and a touch screen controller computes the proportion ratio of the current flow to detect the touch point.

The ultrasonic wave touch glass is configured of 100% glass and it is not affected by surface damage or abrasion, compared with the other types of touch panels where surface damage or abrasion would terminate a usage life of a highly priced touch screen. A touch screen controller transmits an electric signal of 5 MHz to a transmitting converter configured to generate ultrasonic waves and reflected rays allow the generated ultrasonic waves to pass a panel surface. According to such ultrasonic wave type touch panel, in case a user pushes a touch screen surface, a part of the ultrasonic waves passing a touch point is absorbed by the user. A received signal and a lost signal in a digital map may be immediately identified by a controller and a coordinate value of the point where a change in the signal occurred may be calculated accordingly. This process may be independently implemented with respect to the X and Y axes, respectively.

The infrared type touch panel uses a property of an infrared ray that an infrared ray will go straight. The infrared ray is cut off and fails to go straight when meeting an obstacle. A point receiving pressure from the user's touch may cut off infrared rays emitted along the horizontal and vertical directions, and X and Y coordinates of the points where the infrared rays are cut off are read and sensed. Thus, the infrared type touch panel identifies the touch point by determining the cutting off of infrared scanning beams. To form an invisible infrared matrix, an infrared ray beam is emitted from a predetermined surface of each of X and Y axis and the emitted infrared ray beam is received by the other opposite surface in the infrared type touch panel.

Each touch panel type has different advantages, but the infrared type touch panel has been recently receiving attention because of its installation convenience and minimization of pressure received by the touch panel.

As follows, a conventional infrared type touch panel will be described in reference to FIG. 1.

FIG. 1 is a plane view illustrating the conventional infrared type touch panel.

As shown in FIG. 1, the conventional infrared type touch panel is configured to form a kind of an IR matrix. The panel may include a touch panel surface 14, a light emitting part 19 having a light emitting waveguide 10 formed in two sides near the touch panel surface 14, and a light receiving part 20 having a light receiving waveguide 16 formed near another two sides of the touch panel surface 14.

Here, lenses 12 and 15 connected with the light emitting and receiving waveguides 10 and 16 are provided in the light emitting and receiving parts 19 and 20, respectively, to transmit the lights emitted/received via the waveguides straight on the matrix. An LED light source 11 and a light splitter 18 are provided in a predetermined end of the light emitting waveguide 10 of the light emitting part 19 to transmit lights to the light emitting waveguide. A photo sensor part 17 configured to sense touch is connected to a predetermined end of the light receiving waveguide 16 of the light receiving part 20.

In this case, the photo sensor part 17 is a kind of a photo sensor array configured to measure coordinates and it has to be connected with the light receiving waveguide 16 for both X and Y axes.

The light source 11 and the photo sensor part 17 are provided in the ends of the light emitting part 19 and the light receiving part 20, respectively. The portion of the waveguide distant from the light source 11 and the photo sensor part 17 may be lengthened and the areas of the light emitting and receiving parts 19 and 20 may be enlarged.

According to another type of infrared type touch panel, different from the above structure, infrared cameras are located in two corners of a side of a liquid crystal panel, respectively, reflectors are provided in the other sides. After that, the infrared cameras triangulate the touch points to detect touch and touch points.

However, the conventional infrared ray type touch panel has following problems.

First of all, the light emitting part or the light receiving part which includes the waveguide and the lens has to be provided corresponding to the four sides of the touch panel. Accordingly, the configuration for sensing the touch has to be provided over all of the edge portions of the touch panel. As a result, the mechanical arrangement and the length of the electronic circuit line has to be complex and increased, only to generate an electromagnetic interference (EMI) in the display device which can affect the detecting of the touch implemented by the touch panel.

Second, the light receiving part and the light emitting part are each provided in two neighboring sides. As a result, the configuration has to be complex and the effective area happens to be reduced.

Third, in case of the infrared type touch panel including a full-reflective substrate, the corresponding lens has to be mold-injected. If the sizes have to be enlarged, there is a burden of fabricating a new corresponding mold. Therefore, this type may not be easily adapted to different sizes. In addition, an air gap is formed between the full reflection substrate and the display device, and accordingly image quality deterioration, external light scattering and the like may be generated, which can deteriorate the image quality. Also, the thickness of the device is increased because of the full reflection substrate and the air gap.

Fourth, the conventional touch panel would produce a ghost in case of multi-touches and therefore it is impossible to sense the multi-touches.

Fifth, in case the area of the touch panel is enlarged, the number of the pixels has to be enlarged correspondingly and the number of the waveguides and lenses has to be increased. In the module having the preset size, the effective area of the touch panel will be reduced. In case of the large area display device, it is difficult to apply the effective area efficiency of the display panel located under the touch panel having the light emitting part and the light receiving part located there below. Since the bezel of the display device is getting narrower recently, it is difficult to mount the above conventional touch module in the display device because of the volume and the weight.

Sixth, the module for the touch panel and the module to mount the liquid crystal panel therein are separately formed. Therefore, the separated touch module and the liquid crystal module have to be connected to sense a touch. In this case, the touch control unit and the liquid crystal module control unit have to be provided independently and an additional assembly is required.

Seventh, in case of the infrared sensing type using the triangulation, a dead zone in which a touch is impossible to detect, may be generated close to an edge area between the senses. Therefore, the predetermined area corresponding to the dead zone has to be provided in the edge area of the liquid crystal panel. In such case, the size and volume of the touch panel are increased and make a slim structure impossible.

BRIEF SUMMARY

A method of sensing touch on a display device having an optical sensing frame includes emitting first light from a sensor module, receiving a first reflection at the sensor module, emitting second light from a waveguide, receiving a second reflection at the waveguide. The method further includes, if a touch is made on an optical sensing frame, detecting that reflections of the first and the second light are interfered, and determining a change in the quantity of the first and second reflection received to determine the touch.

A display device including an optical sensing frame includes a display panel, two optical sensor modules disposed on the display panel operable to emit first light and receive a first reflection, a wave guide disposed at a side of the display panel for emitting second light and receiving a second reflection, an optical reflecting member disposed at each of the remaining sides of the display panel for reflecting the first light as the first reflection and reflecting the second light as the second reflection.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DETAILED DESCRIPTION OF THE DRAWINGS AND THE PRESENTLY PREFERRED EMBODIMENTS

Reference will now be made in detail to the specific embodiments of the present disclosure, examples of which are illustrated in the accompanying drawings. Wherever possible, the same reference numbers will be used throughout the drawings to refer to the same or like parts.

As follows, a display device including an optical sensing frame according to the present disclosure and a method of sensing a touch will be described in reference to the accompanying drawings.

Figure 1:
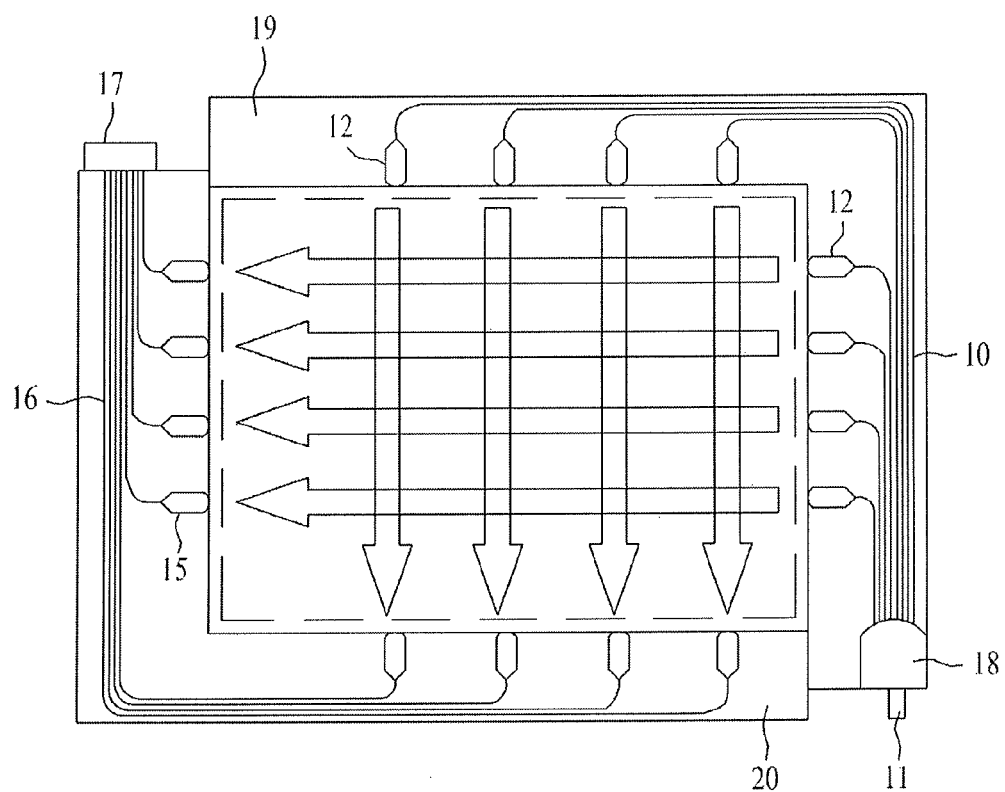
FIG. 1 is a is a plane view illustrating a conventional infrared type touch panel.
Figure 2:
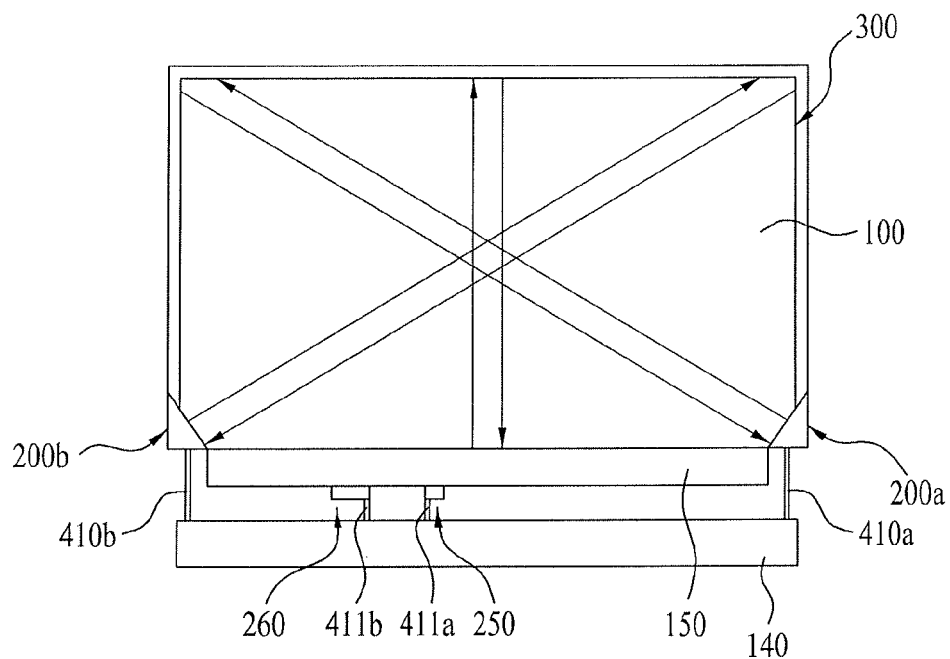
FIG. 2 is a plane view illustrating a display device including an optical sensing frame according to the present disclosure.

FIG. 2 is a plane view illustrating a display device including an optical sensing frame according to the present disclosure.

As shown in FIG. 2, the display device including the optical sensing frame includes a rectangular display panel 100 having plane having four sides, a waveguide unit 150 formed corresponding to a side of the display panel 100, the waveguide unit being multi-layered with a light emitting layer (151, see FIG. 4) configured to emit an infrared ray light and a light receiving layer (153, see FIG. 4) configured to receive a reflected-light to detect touch, infrared camera sensors 200a and 200b located at both opposite ends of the waveguide unit 150, a retro-reflector 300 formed corresponding to the other three sides of the display panel 100, and a casing structure (not shown) configured to enclose the display panel 100, the waveguide unit 150, the infrared camera sensors 200a and 200b and the retro-reflector 300.

Here, the display panel is a flat panel such as a liquid crystal panel, an organic luminescence display panel, a plasma display panel and the like.

The waveguide unit 150, the infrared camera sensors 200a and 200b and the retro-reflector 300 may be on an edge portion of the display panel 100 on the same plane.

At this time, the waveguide unit 150 and the infrared camera sensors 200a and 200b have a light emitting/receiving function. A light may be emitted from the waveguide unit 150 toward the retro-reflector located opposite to the waveguide unit 150 and the retro-reflector 300 may retro-reflect the received light to the waveguide unit 150, such that the waveguide unit 150 may receive the light. If there is a touch, light emitting/reflecting at a point corresponding to the touch may be cut off and then there will be difference of the quantity of the received lights. Therefore, the difference of the light quantity may be detected to be a touch. In this case, the waveguide unit 150 may be located corresponding to a single side of the display panel and the touch detecting is possible only at a single axis direction.

Here, the infrared camera sensors 200a and 200b triangulates the touch point because they are located at the end of the predetermined side of the display panel. In this case, lights emitted from the infrared camera sensors 200a and 200b located at the both opposite ends of the display panel 100 are retro-reflected by the retro-reflector 300 toward the infrared camera sensors 200a and 200b. To that end, a front surface of each infrared camera sensor 200a and 200b is faced toward a diagonal corner. If there is a touch, a light emitted from the infrared camera sensors 200a and 200b is cut off at a touch point to stop the light from being retro-reflected and the change or difference of the reflected light quantity is recognized, to detect the touch and the touch point.

However, touch detecting is possible even if only the single axis direction is detected by the waveguide unit 150. This is because the touch detecting is implemented by the infrared camera sensors 200a and 200b. As a result, even if the waveguide unit 150 is located only in a single direction, the triangulation of the infrared camera sensors 200a and 200b will be implemented to enable the touch detecting. In order to make touch detection possible, the waveguide unit 150 only needs to compensate for the ghost occurring in a first touch detecting process. That is, in case of a single touch, the waveguide unit 150 determines a position of an axis (X axis) in a predetermined area (namely, dead zone) adjacent to the sides having the infrared camera sensors located therein, to detect a touch point.

As shown in FIG. 2, in case of two or more multi-touches, a first touch detecting is implemented by using the infrared camera sensors 200a and 200b and then touch point detecting is secondarily implemented in the predetermined single axis by the waveguide unit 150. After that, a value different from a single-axis detected value and a first detected value detected by the waveguide unit 150 may be a ghost and may be removed accordingly.

As follows, detailed configuration of each element will be described.

Figure 3:
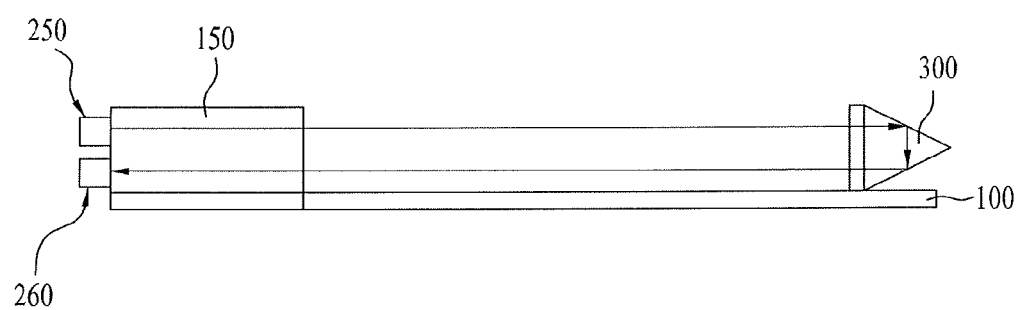
FIG. 3 is a sectional view schematically illustrating light-emitting and light-receiving of a waveguide and a retro-reflector shown in FIG. 2.
Figure 4:
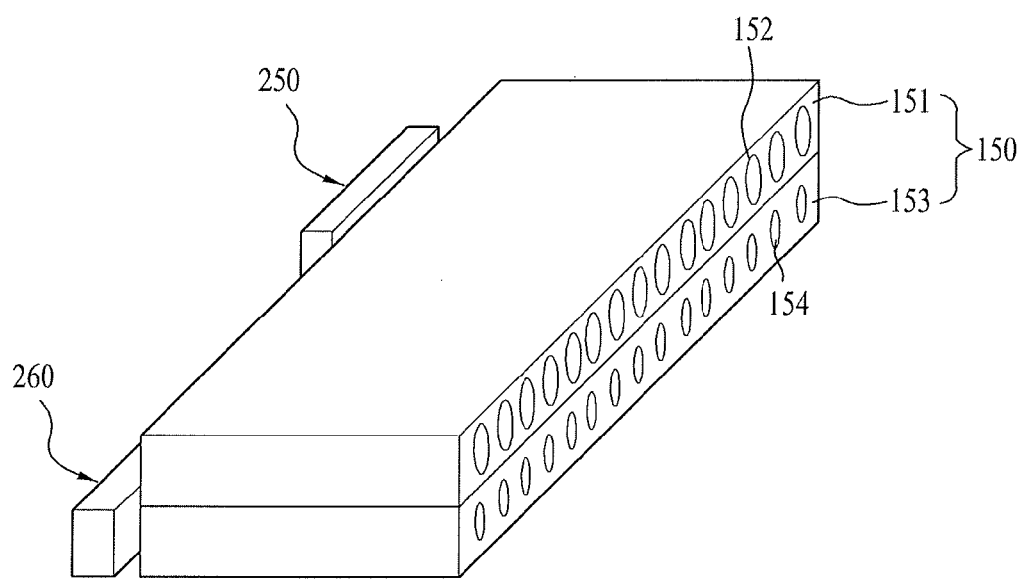
FIG. 4 is a perspective view illustrating the waveguide of FIG. 2.

FIG. 3 is a sectional view schematically illustrating light-emitting and light-receiving of a waveguide and a retro-reflector shown in FIG. 2. FIG. 4 is a perspective view illustrating the waveguide of FIG. 2.

As shown in FIGS. 3 and 4, the lights are emitted straight from the waveguide unit 150 at different positions with respect to an X axis and the retro-reflector 300 reflects the received lights in a reverse direction. That is, the lights having a property of going straight are received by the retro-reflector 300 and the reflected lights are transmitted in a straight line. In this case, the waveguide unit 150 and the retro-reflector 300 are located on the same plane. The LED 250 and the line sensor 260 provided in the waveguide unit 150 may emit lights in a straight line and receive the light, respectively.

The waveguide unit 150 and the retro-reflector 300 are located on the display panel 100 and the lights emitted and received by them may be infrared ray beams which cannot affect display of the display panel 100.

As shown in FIG. 4, the waveguide unit 150 is formed of the light emitting layer 151 and the light receiving layer 153 which are multi-layered. In this case, the positions of the light emitting layer 151 and the light receiving layer 153 may be reversed.

The light emitting layer 151 of the waveguide unit 150 includes the infrared LED 250 configured to emit the infrared ray light, a light splitter (not shown) configured to split the lights emitted from the infrared LED, and a plurality of optical fibers 152 configured to transmit the lights emitted after being split by the light splitter from a plurality of points with respect to an X axis direction.

The light receiving layer 153 of the waveguide unit 150 includes a plurality of optical fibers 154 to transmit the lights received after being reflected by the retro-reflector 300 and a line photo sensor 260 connected with the optical fibers 154 to detect a touch from the light transmitted from the optical fibers 154.

Depending on the needs, a light-efficient optical lens may be further provided adjacent to the side corresponding to the display panel.

Figure 5A:
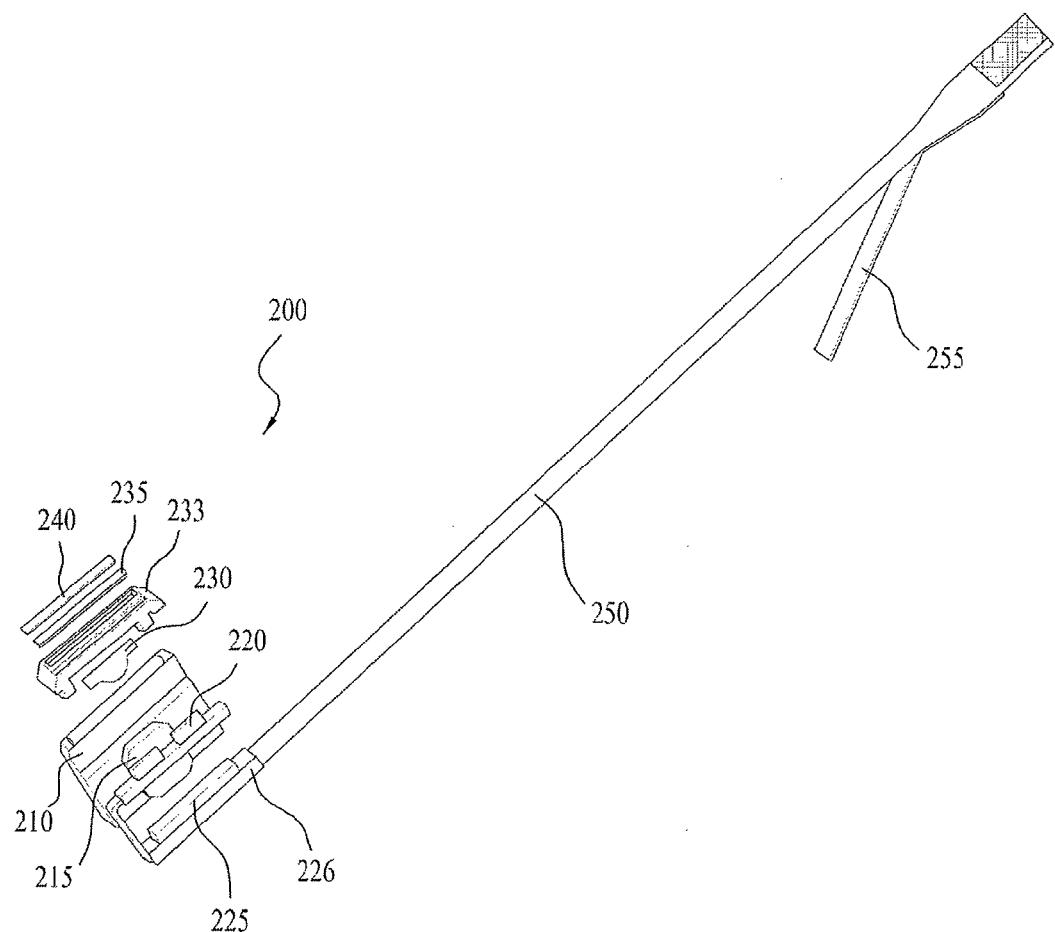
FIGS. 5a and 5b are perspective views illustrating an infrared camera sensor of FIG. 2.
Figure 5B:
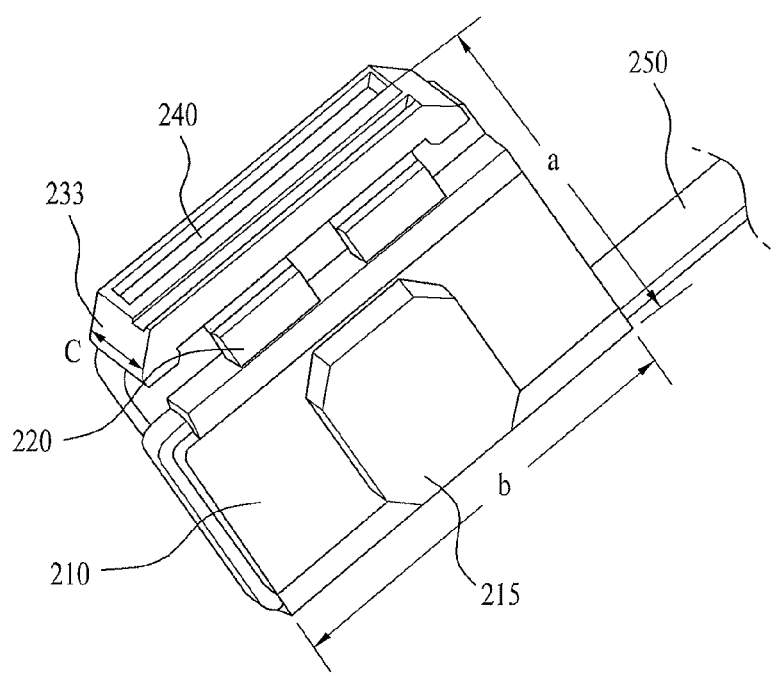

FIGS. 5a and 5b are perspective views illustrating the infrared camera sensor of FIG. 2.

Such infrared camera sensor 200 (200a and 200b) includes an infrared LED 220 configured to emit an infrared ray, an optical lens 235 configured to adjust an emitting angle of the light emitted by the infrared LED 220, an objective lens 230 configured to concentrate the received lights, a photo sensor 225 configured to sense the lights concentrated by the objective lens 230, and a first optical filter 240 located in front or rear of the objective lens 230. The infrared camera sensor 200 also includes a housing 210 configured to have the infrared LED 220 on the front thereof, the photo sensor 225 located in rear thereof and to have the objective lens 230, the optical lens 235 and the first optical filter 240 mounted therein, and a cover mold 233 configured to cover a top of the housing 210 to protect the inner parts of the housing 210.

Here, the cover mold 233 and the housing 210 may include an open area to pass the received lights there through. The photo sensor 225 is provided in the open area. In this case, the received light is received by the photo sensor 225 via the first optical filter 240 and the objective lens 230.

The infrared LED 220 is configured to emit a light toward the retro-reflector 300. Here, the optical lens 235 is able to emit a light from the infrared LED 220 above and below 5° with respect to a surface perpendicular to a surface of the LED 220 which is in parallel to a surface of the display panel 100. The optical lens 235 also has an angle of view approximately 90°~100° with respect to a surface perpendicular to a lens surface.

The photo sensor 225 configured as a line sensor array may be arranged on a PCB 226. The PCB 226 may be directly connected with a control unit of the display panel via a FPC (Flexible Printed Cable) 250. In this case, the infrared camera sensor 200 may be directly controlled by the control unit of the display panel. The FPC 250 is folded at a rear surface of infrared the camera sensor 200 and a double-sided tape is placed on a side surface of a case top (180, see FIG. 9) such that the infrared camera sensor 200 may be attached to the side surface of the case top 180 by the double-sided tape (not shown).

At this time, resolution of the photo sensor 225 may be 500 pixels or more in a horizontal direction to detect positions in 500 pixels or more in the horizontal direction.

Meanwhile, the retro-reflector 300 corresponds to four sides of the display panel 100 and it is attached to a side portion of a guide structure (not shown). In this case, the infrared camera sensors 200a and 200b are located in corners of the display panel 100, with the height of approximately 4 mm or less and preferably 2.7 mm or less, on the same plane as the guide structure. Also, a projection 215 is provided in a top of the housing 210 to be secured to a case structure such as a case top (180, see FIG. 10). In this case, the projection 215 is coupled to a recess (180a, see FIG. 10) provided in the casing top (180).

The infrared camera sensor 200 may be configured to receive the light retro-reflected from at least two sides.

In addition, the infrared camera sensor 200 may be configured to sense the lights reflected from the retro-reflector 300 or the cut-off of lights emitted from the infrared camera at the touch point of a touch object (input means such as a human hand and pen) in case there is a touch.

At this time, the photo sensor 225 may be a line sensor array including a plurality of sensors and has a resolution of 500 pixels or more in a horizontal direction.

The infrared camera sensor 200 may be configured to sense the lights reflected from the retro-reflector 300 or the cut-off of lights emitted from the infrared camera at the touch point in case there is a touch.

Figure 6:
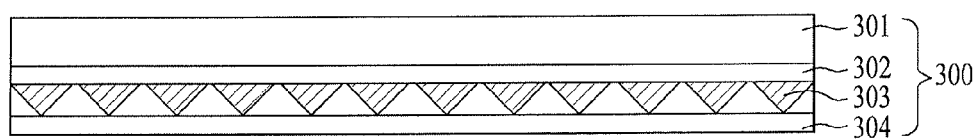
FIG. 6 is a sectional view illustrating the retro-reflector of FIG. 2.
Figure 7:
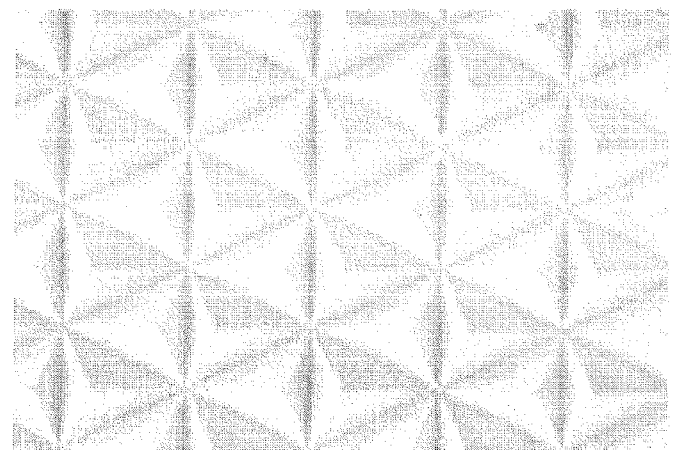
FIG. 7 is a photograph of the retro-reflector shown in FIG. 2, seen from a top.
Figure 8:
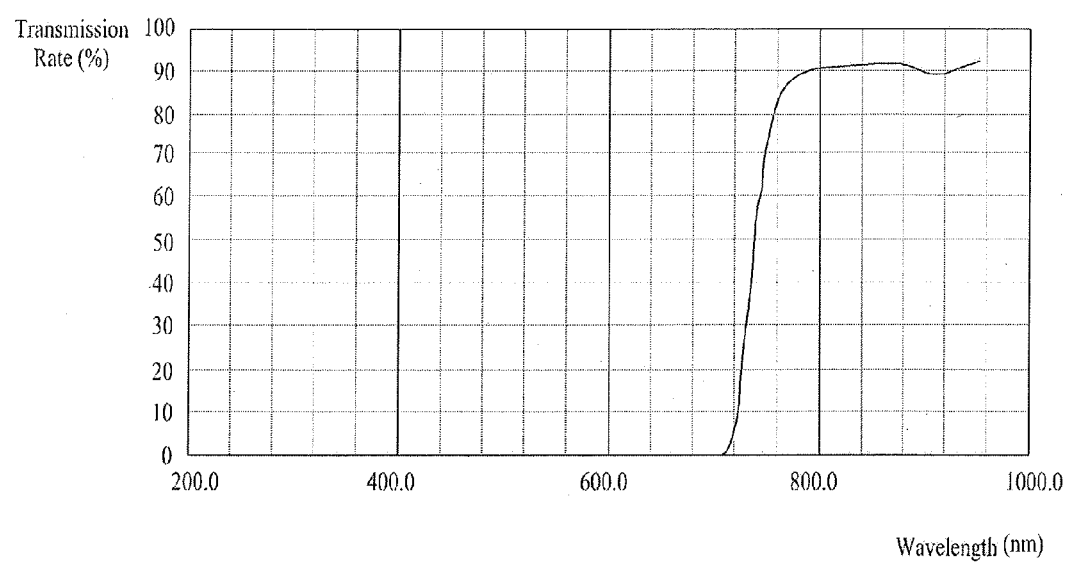
FIG. 8 is a graph illustrating a transmission property of an optical filter provided in the retro-reflector of FIG. 6.

FIG. 6 is a sectional view illustrating the retro-reflector of FIG. 2. FIG. 7 is a photograph of the retro-reflector shown in FIG. 2, seen from a top. FIG. 8 is a graph illustrating a transmission property of an optical filter provided in the retro-reflector of FIG. 6.

As shown in FIGS. 6 to 8, the retro-reflector 300 includes an optical filter 301 configured to transmit only lights having an infrared band, a retro-reflecting layer 303 configured to retro-reflect the received lights and a first adhesive layer 302 configured to allow the optical filter 301 and the retro-reflecting layer 303 to attach to each other. A second adhesive layer 304 may be further provided under the retro-reflecting layer 303 to be attached to an inner surface of the case top 180 used as casing structure.

Here, the retro-reflecting layer 303 is formed of a cube-corner type structure. At this time, an incident angle may be about 0° to 65° which can be selectable according to a retro-reflection ratio and it may be a serially-formed micro-prism, as shown in FIG. 7.

The optical filter may transmit only the infrared or higher lights and cut-off an optical band which is higher than the other visible lights. For that, black material is coated to cut-off of the visible band. For example, a cut-off frequency of the optical filter 301 may be approximately 700 nm.

The optical filter is formed of acrylic resin, for example, PMMA (Poly Methyl Methacrylate) or Polycarbonate. Alternatively, the first optical filter 301 may include a glass component.

Figure 9:
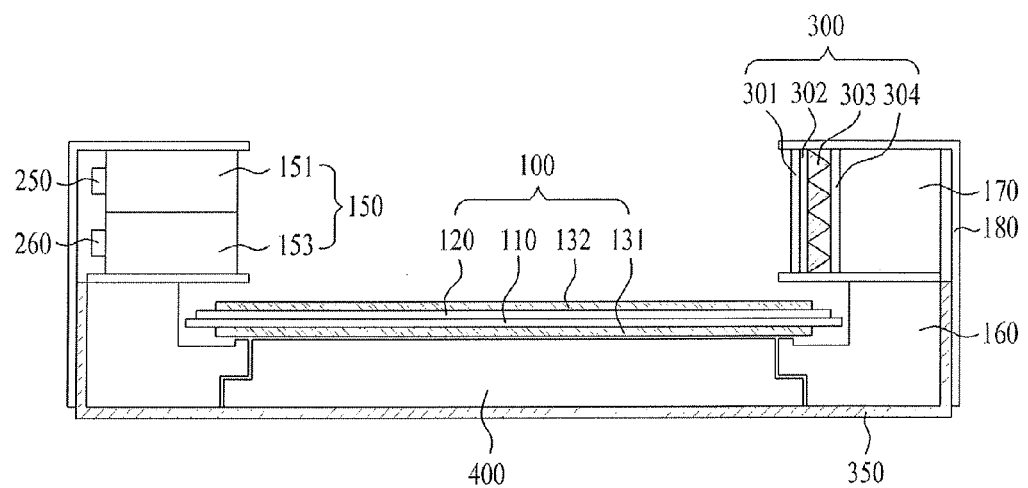
FIG. 9 is a sectional view illustrating the display device including the optical sensing frame of FIG. 2 more specifically.
Figure 10:
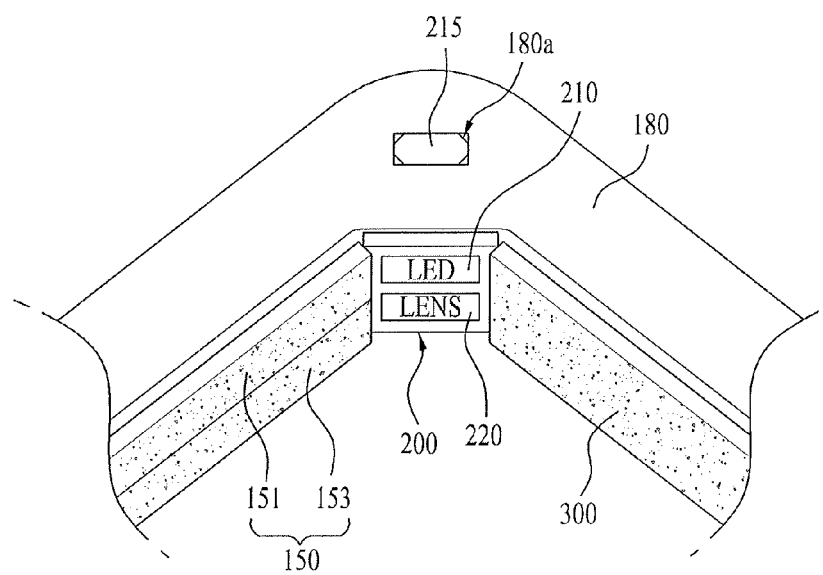
FIG. 10 is an inner perspective view illustrating the retro-reflector, the infrared camera sensor and the waveguide unit which are connected with a case top of the display device including the optical sensing frame according to the present disclosure.

FIG. 9 is a sectional view illustrating the display device including the optical sensing frame of FIG. 2 in more detail. FIG. 10 is an inner perspective view illustrating the retro-reflector, the infrared camera sensor and the waveguide unit which are connected with a case top of the display device including the optical sensing frame according to the present disclosure.

As shown in FIGS. 9 and 10, according to the display device including the optical sensing frame, the waveguide unit 150, the retro-reflector 300 provided on sides of the guide structure 170 and the infrared camera sensor 200 (200a and 200b) may be located on the edge portion of the display panel 100, on the same plane, to sense touches by emitting and receiving infrared lights having the property of going straight.

Here, the waveguide unit 150, the guide structure 170, the retro-reflector 300 and the infrared camera sensor 200 will be referenced to as an 'optical sensing frame' in consideration of the touch detecting function and the touch points.

According to FIG. 9, the display panel 100 is a liquid crystal panel and it includes first and second substrates 110 and 120 which are opposed to each other, with a liquid crystal layer (not shown) disposed there between, and first and second polarizing plates 131 and 132 formed in back surfaces of the first and second substrates 110 and 120, respectively.

A backlight unit 400 is located below the display panel 100 and a support main 160 is formed to support the backlight unit, the display panel 100 and the guide structure 170. A cover bottom 350 is formed to accommodate the backlight unit 400 and the support main 160.

The case top 180 is formed to cover the guide structure 170, the infrared camera sensor 200 and the waveguide unit 150. In this case, the case top 180 is configured to cover the cover bottom 350 from a side surface. The case top 180 and the cover bottom 350 configured as casing will be referenced to as 'casing structure'.

A bottom of the guide structure 170 is projected toward a top surface of the display panel 100 to support the retro-reflector 300. Because of that, the retro-reflector 300 and the guide structure 170 may be coupled to each other securely.

Each element of the optical sensing frame may be covered by the case top 180 not to be exposed to the outside. The optical sensing frame is formed in the case top. Considering that the case tope is spaced apart a predetermined distance from the liquid crystal panel in the structure without the optical sensing frame, the overall structure may be slimmer and the optical sensing frame may be embedded inside the case top 180.

Especially, according to FIG. 10, the infrared camera sensor is seen from an inside of the case top. In this case, the infrared camera sensor 200 is shown as including a the infrared LED (referring 220 in FIGS. 5A and 5B) configured to emit the light and the lens configured to receive and sense the retro-reflected light from the retro-reflector 300.

Here, as shown in FIGS. 5a and 5b, the infrared camera sensor 200 has the projection 215 and the projection 215 is coupled to the guide recess 180a provided in the case top 180.

In another aspect of the present disclosure, a method of sensing a touch for the display device including the optical sensing frame will be described as follows.

First of all, the display device including the optical sensing frame having the above configuration is prepared.

A predetermined area of the display panel is touched by the input device such as the human finger or pen.

Next, the infrared camera sensor and the waveguide unit may recognize the cut off the emitted lights which prevents prevent lights from retro-reflected, and recognize the change of the light quantity to detect a touch and a touch point.

In this case, the touch and touch point detecting is implemented by the infrared camera sensor. The infrared camera sensor located at the end of the side of the display panel may triangulate the touch point.

In addition, the waveguide unit implements the detecting of the touch and touch point. The waveguide unit formed at the side of the display panel detects the cut-off of the lights emitted from a light-emitting layer of the waveguide unit so that the retro-reflection of the lights is prevented. After that, a light receiving layer senses the change of the light quantity, to sense an axis position of the touch point.

Figure 11:
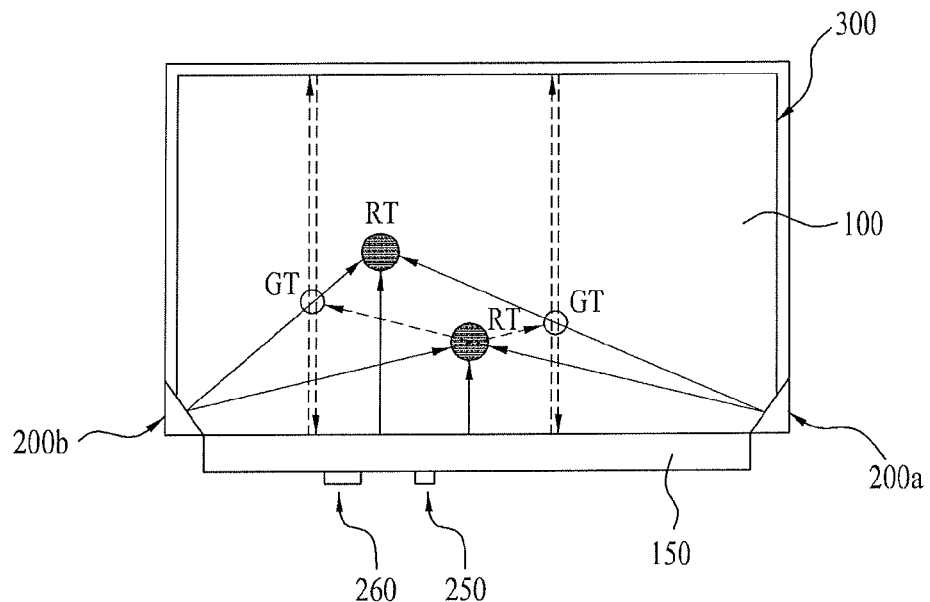
FIG. 11 is a plane view illustrating a method of sensing multi-touch according to the present disclosure.

FIG. 11 is a plane view illustrating a method of sensing multi-touch according to the present disclosure.

As shown in FIG. 11, in case of a multi-touch, detecting of a touch include the following.

Firstly, the infrared camera sensors (sensor modules) 200a and 200b emit first light. A first reflection is received at the sensor modules.

The waveguide unit 150 emits a second light from a waveguide. A second reflection is received at the waveguide. If a touch is made within the optical sensing frame, the infrared camera sensors 200a and 200b, and the waveguide unit 150 detects that reflections of the first and the second light are interfered, and determines a change in the quantity of the first and second reflection received to determine the touch.

Here, a first determination of the position of the touch is made by triangulation of the touch based on the first reflection. And a second determination of a position along an axis parallel to a length of the waveguide of the touch is made based on the second reflection.

As shown in FIG. 11, if a multi-touch is made, determining actual positions RT of the multi-touch is based on the first and the second determination. Initially the first determination includes actual positions (RT) and ghost positions GT.

Here, the first determination comprises actual position (RT) information of the multi-touch and ghost position (GT) information, the actual position information and the ghost position information each including a first axis (X-axis in FIG. 11) information and a second axis information (Y-axis in FIG. 11).

Specifically, when the multi-touch is made, comparison is made between the first axis information and the second determination to determine the actual positions RT of the multi touch.

In the comparing step, the ghost position GT from the initially detected touch point RT and GT is excluded as ghost.

The touch detecting is compensated by the infrared camera sensor 200a and 200b, and the waveguide unit 150 and the ghost GT may be prevented even in case of the multi-touch, by the comparing the first axis information of the determination and the second determination.

Figure 12:
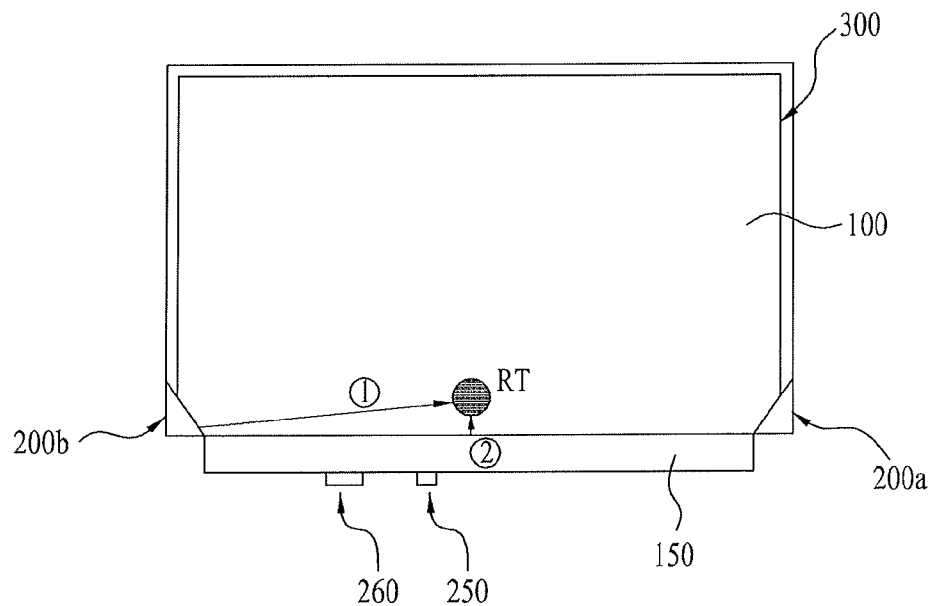
FIG. 12 is a plane view illustrating a method of sensing dead-zone according to the present disclosure.

FIG. 12 is a plane view illustrating a method of sensing dead-zone according to the present disclosure;

As shown in FIG. 12, the touch detection may also be made in a dead zone.

When the touch position is located on the dead zone, determining an actual position RT of the touch is based on the second determination such as ② and the first determination such as ① by one of the infrared camera sensors 200a and 200b. That is, a third determination of the position of the touch may be made by triangulation of the touch based on the first reflection and the second reflection.

On some occasion, when the touch position is on the dead zone, determining an actual position may be determined by comparing the first axis information and the second determination.

Thus accurate touch detecting is possible in all areas of the display panel. That is, both the waveguide unit, which is capable of emitting/receiving lights, and the infrared camera are provided. Because of that, the ghost or dead zone may be removed, which are impossible to detect by using the single sensing means in case of the multi-touch, and the detecting is possible in case of sensing three touches or more.

It will be apparent to those skilled in the art that various modifications and variations can be made in the present disclosure without departing from the spirit or scope of the disclosure. Thus, it is intended that the present disclosure covers the modifications and variations of this invention provided they come within the scope of the appended claims and their equivalents.

The invention claimed is:

1. A method of sensing touch on a display device having an optical sensing frame comprising:
    emitting first light from a sensor module;
    receiving a first reflection at the sensor module;
    emitting second light from a waveguide;
    receiving a second reflection at the waveguide; and
    if a touch is made on an optical sensing frame:
        detecting that reflections of the first and the second light are interfered, and
        determining a change in the quantity of the first and second reflection received to determine the touch,
        wherein a first determination of the position of the touch is made by triangulation of the touch based on the first reflection;
        wherein a second determination of a position along an axis parallel to a length of the waveguide of the touch is made based on the second reflection, and
    wherein:
        if a multi touch is made, determining actual positions of the multi touch based on the first and the second determination,
    wherein the first determination comprises actual position information of the multi touch and ghost position information, the actual position information and the ghost position information each including a first axis information and a second axis information, the method further comprising:
        comparing the first axis information and the second determination to determine the actual positions of the multi touch.

2. The method of claim 1, wherein the sensor module comprises an optical sensor module.

3. The method of claim 2, wherein the optical sensor module includes two cameras disposed at both ends of the waveguide.

4. The method of claim 3, wherein if a touch is made on a dead zone, a third determination of the position of the touch is made by triangulation of the touch based on the first reflection and the second reflection.

5. The method of claim 1, wherein:
if a touch is made on a dead zone, determining an actual position of the touch based on the second determination.

6. A display device including an optical sensing frame, comprising:
a display panel;
two optical sensor modules disposed on the display panel operable to emit first light and receive a first reflection;
a wave guide disposed at a side of the display panel for emitting second light and receiving a second reflection;
an optical reflecting member disposed at each of the remaining sides of the display panel for reflecting the first light as the first reflection and reflecting the second light as the second reflection; and
a touch control unit coupled to the two optical sensor modules and the wave guide unit, wherein the touch control unit is operable to:
detect that reflections of the first and second light are interfered,
determine a change in the quantity of the first and second reflection received to determine a touch,
make a first determination of a position of the touch by triangulation of the touch based on the first reflection, and
make a second determination of a position along an axis parallel to a length of the waveguide of the touch based on the second reflection,
if a multi touch is made, determine actual positions of the multi touch based on the first and the second determination,
wherein the first determination comprises actual position information of the multi touch and ghost position information, the actual position information and the ghost position information each including a first axis information and a second axis information, the touch control unit further operable to:
compare the first axis information and the second determination to determine the actual positions of the multi touch.

7. The device of claim 6, further comprising a casing configured to enclose the display panel, the optical sensor module, the wave guide and the optical reflecting member.

8. The device of claim 6, wherein the first light and the second light is infrared light.

9. The device of claim 6, wherein the touch control unit is further operable to:
determine an actual position of the touch based on the second determination.

10. The device of claim 6, wherein if the touch is made on a dead zone, a third determination of the position of the touch is made by triangulation of the touch based on the first reflection and the second reflection.

11. The device of claim 6, wherein:
the two optical sensor modules are disposed on the same side of the display panel as the waveguide, the each of the two optical sensor module disposed at both opposite ends of the waveguide.

12. The device of claim 11, wherein each of the two optical sensor modules has an angle of view of about 90°~100° with respect to a surface perpendicular to a surface of the two optical sensor modules.

13. The device of claim 11, wherein each of the two optical sensor modules comprises a line sensor array or a two-dimensional sensor array.

14. The device of claim 6, wherein the waveguide comprises a stacked structure including a light emitting layer operable to emit the second light and a light receiving layer operable to receive the second reflection.

15. The device of claim 14, wherein the light emitting layer includes an infrared LED for emitting the second light, a light splitter for splitting the second light emitted from the infrared LED, and a plurality of first optical fibers for transmitting the second light from the light splitter for emission from a plurality of points with respect to an axis parallel to a length of the waveguide.

16. The device of claim 14, wherein the light receiving layer includes a plurality of second optical fibers for transmitting the received second reflection and a line sensor array or a two-dimensional sensor array connected to the second optical fibers.

17. The device of claim 6, wherein the optical reflecting member comprises:
a second optical filter for transmitting lights having an infrared band; and
a retro-reflecting layer for retro-reflecting the first and the second light in to the first and the second reflection,
wherein the retro-reflecting layer is formed of a cube-corner type structure.

* * * * *